United States Patent [19]

Dohi et al.

[11] Patent Number: 4,692,676
[45] Date of Patent: Sep. 8, 1987

[54] SEWING MACHINE DRIVING APPARATUS

[75] Inventors: Takashi Dohi, Hirakata; Nobuho Shibata, Katano; Kenichi Ohara, Hirakata, all of Japan

[73] Assignee: Matsushita Electric Industrial Co., Ltd., Kadoma, Japan

[21] Appl. No.: 798,279

[22] PCT Filed: Feb. 26, 1985

[86] PCT No.: PCT/JP85/00087
§ 371 Date: Nov. 4, 1985
§ 102(e) Date: Nov. 4, 1985

[87] PCT Pub. No.: WO85/03958
PCT Pub. Date: Sep. 12, 1985

[30] Foreign Application Priority Data

Mar. 2, 1984 [JP] Japan ................................. 59-41149
Mar. 19, 1984 [JP] Japan ................................. 59-52529

[51] Int. Cl.⁴ .......................................... H02P 3/10
[52] U.S. Cl. .................................... 318/269; 318/374; 318/254; 112/275
[58] Field of Search ............... 318/269, 373, 374, 254; 112/275

[56] References Cited

U.S. PATENT DOCUMENTS

| | | | |
|---|---|---|---|
| 3,832,613 | 8/1974 | Bernstein et al. | 318/269 |
| 3,940,670 | 2/1976 | Tanikoshi | 318/269 X |
| 3,991,693 | 11/1976 | Mora | 318/269 X |
| 4,054,819 | 10/1977 | Johnson | 318/269 |
| 4,139,808 | 2/1979 | Matsummara | 318/374 X |

Primary Examiner—Benjamin Dobeck
Attorney, Agent, or Firm—Wenderoth, Lind & Ponack

[57] ABSTRACT

The present invention provides a machine driving apparatus which is composed of a brushless motor for switching the energization phase of the stator winding in accordance with the position of a rotor with a permanent magnet being provided in a rotor as a machine driving motor, compares a speed instructing signal to be generated from a speed instructing unit 32 in accordance with the displacement amount of a machine pedal 31 with a speed detecting signal detected by a speed detector 44 to control the rotational speed of a motor 42, also damps in reverse operation the motor 42 with a stop instructing signal to be generated by a position instructing unit 33 in accordance with the operation of the machine pedal 31 and a needle position detecting signal detected by a needle position detector 46 to stop the machine needle in a given position.

6 Claims, 8 Drawing Figures

FIG. I
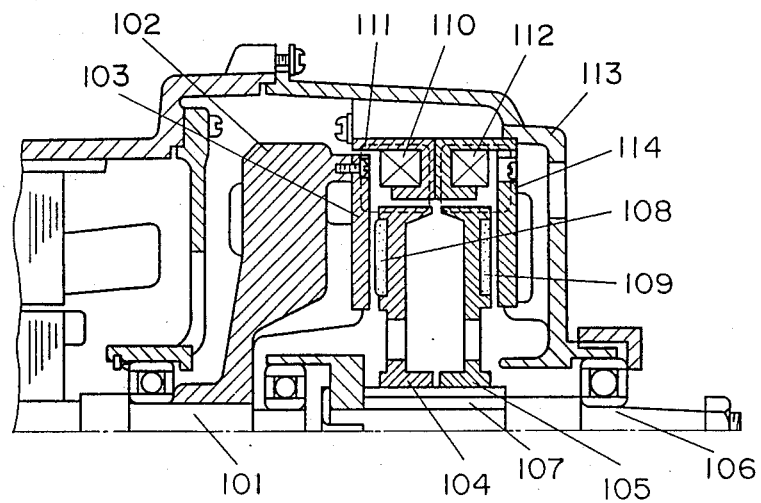
FIG. 2
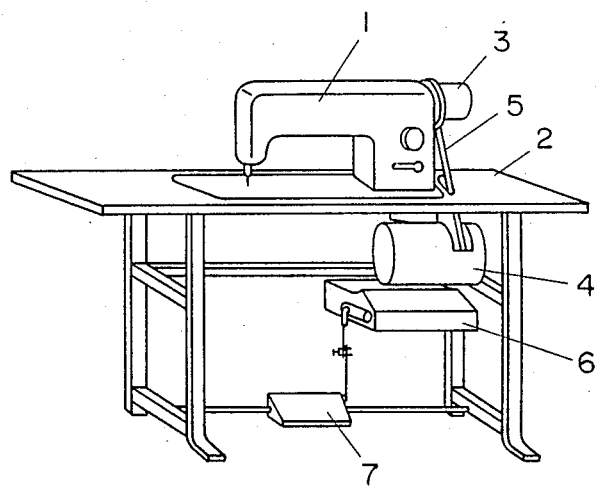

FIG. 5

| section | 1 | 2 | 3 | 4 | 5 | 6 | 1' | 2' | 3' | 4' | 5' | 6' |
|---|---|---|---|---|---|---|---|---|---|---|---|---|
| $T_1$ | ▨ | ▨ |  |  |  |  |  |  |  | ▨ | ▨ |  |
| $T_2$ |  | ▨ | ▨ |  |  |  |  |  |  |  | ▨ | ▨ |
| $T_3$ |  |  | ▨ | ▨ |  |  |  |  |  |  |  | ▨ |
| $T_4$ |  |  |  | ▨ | ▨ | ▨ |  | ▨ | ▨ |  |  |  |
| $T_5$ |  |  |  |  | ▨ | ▨ | ▨ | ▨ |  |  |  |  |
| $T_6$ | ▨ |  |  |  |  | ▨ | ▨ | ▨ | ▨ |  |  |  |
| $e_R$ | ▨ | ▨ |  |  | ▨ | ▨ |  | ▨ | ▨ |  | ▨ | ▨ |
| $e_S$ | ▨ |  | ▨ | ▨ |  | ▨ | ▨ |  | ▨ | ▨ |  | ▨ |
| $e_T$ |  | ▨ | ▨ |  | ▨ | ▨ |  | ▨ | ▨ |  | ▨ |  |

SEWING MACHINE DRIVING APPARATUS

FIELD OF TECHNOLOGY

The present invention relates to a sewing machine driving apparatus and more particularly, to a driving apparatus for an industrial sewing machine, which is capable of performing a variable-speed operation including the driving stop of the sewing machine, and the given-position stop of a sewing machine needle.

BACKGROUND ART

Conventionally, the sewing machine driving apparatus uses a driving motor shown in FIG. 1. The driving motor has an induction motor, a clutch and a brake mechanism integrated in construction. A driving shaft 101 of the induction motor, and a fly-wheel 102 connected with it, and a clutch friction plate 103 continuously rotate and store rotational energies in the fly-wheel 102. A clutch moving disc 104 and a brake moving disc 105 may axially slide on a spline 107 pressed into the output shaft 106 and have linings 108 and 109, respectively. Now, suppose a clutch magnet 110 is excited to produce magnetic flux 111, the clutch moving disc 104 moves leftwardly, the lining 108 is brought into pressure contact against a continuously rotating clutch friction disc 103 and the rotating force of the fly-wheel 102 is transmitted to an output shaft 106 through the spline 107. Then, when a brake electromagnet 112 is excited, a brake moving disc 105 moves rightwardly and the lining 109 is brought into pressure contact against a brake friction disc 114 secured to a bracket 113 to cause an output shaft 106 to come to an abrupt stop. The rotational force of the output shaft 106 is normally transmitted to the machine head through a belt. Speed signals detected by a detector are fed back and the exciting current of a clutch electromagnet 110 is adjusted to cause a half-clutch condition to perform the speed control of the machine. Also, a given-position stop of the machine needle is performed through the excitation of a brake electromagnet 112 with the needle position signal of a detector.

In recent years, higher functions of the industrial machine and development of an automatic machine allows the driving motor to have a stronger tendency of providing not only the conventional driving stop, but also the long hours' operations at an intermediate speed. In the conventional motor shown in FIG. 1, the lining 108 was slid as described hereinabove and was used at the half-clutched condition during an intermediate-speed operation so as to promote the abrasion of the lining, thus resulting in insufficient service life.

A method of applying molybdenum-bisulfide containing grease on the sliding face was put into practical use. Generally, the lining was chiefly composed of cork, including binder such as urethane, and impregnated oil. Considerably longer service life was achieved, but restrictions such as periodical grease application or lining exchange were required. As the reactance of the electromagnet was comparatively large, the stability of the speed was inferior on the side of the clutch and the stop position of the machine needle was likely to be dispersed due to the delay of the exciting current on the side of the brake.

In order to improve the service life, a system with a friction type clutch being replaced by an eddy-current clutch is proposed and put into practical use in some quarters. This system was clearly improved in such clutch service life as described hereinabove to transmit the rotational force of the fly-wheel to the output shaft through non-contact, but no progress was made in the service life of the brake portion, because the brake portion used the friction type brake similar to the conventional one due to insufficient damping force. Also, to prevent the eddy-current producing portion from being thermally deformed, the exciting current had to be restricted, so that sufficient torque could not be provided.

Furthermore, the conventional systems consumed unnecessary power, because the driving motor always had to be rotated in spite of the driving and stopping operations of the machine. Normally, the operation time of the machine was 20 to 30%, the motor was loosely operated in the remaining 70 to 80%, and in a motor of 400W in single phase, the power of about 100W was consumed in vain.

Also, the fly-wheel provided in the driving motor had to be made larger in its outer diameter and heavier in weight because of the requirement of greater rotational energy, thus interfering with possible smaller size and lighter weight of the driving motor.

DISCLOSURE OF THE INVENTION

According to the present invention, in a sewing machine driving apparatus provided with a driving motor, a speed detector, a machine needle position detector, a speed control means and a machine needle position control means, a permanent magnet is provided in a rotor as a driving motor, a brushless motor is provided which switches the energization phase of the stator winding in accordance with the position of the rotor, the speed control of the motor is performed through comparison of a speed instruction signal to be produced in accordance with the operation of the machine pedal and a speed detection signal detected by the speed detector, also the motor is dampingly reversed with a stop instruction signal to be produced in accordance with the operation of the machine pedal and a needle position signal of a machine needle position detector to stop the machine needle at a given position, the friction portion is removed to render the service life longer, the motor is stopped in the inoperative position of the machine to save the energy, the stability of the speed and the stop position precision of the machine needle is improved, and the clutch brake portion and the fly-wheel are removed to render the size smaller and the weight lighter.

BRIEF DESCRIPTION OF THE DRAWINGS

FIG. 1 is a cross-sectional view showing the construction of the conventional driving motor.

FIG. 2 is a perspective view showing the construction example of a machine provided with a machine driving apparatus of the present invention.

FIG. 5 is a time chart showing the operation of a distribution circuit of the present invention.

BEST MODE FOR CARRYING OUT THE INVENTION

Figure 3:
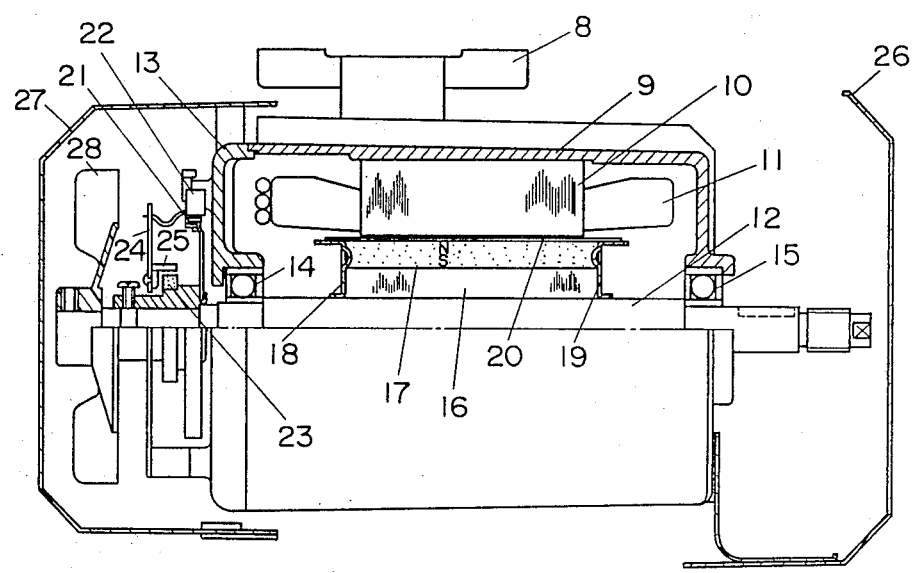
FIG. 3 is a sectional view showing the construction of a driving motor portion of the present invention.

One embodiment of the present invention will be described hereinafter in accordance with FIGS. 2 through 7.

FIG. 2 shows the entire construction of an industrious machine provided with a machine driving apparatus in the embodiment of the present invention. 1 is a machine head disposed on a machine table 2. 3 is a needle position detector for detecting the needle position of the machine and is mounted on the machine head 1. 4 is a driving motor, which is composed of a brushless motor mounted on the underface of the machine table 2 so as to drive the machine shaft (not shown) through a belt 5. 6 is a control portion which receives a needle position signal from the needle position detector 3 and an instruction signal to be produced in response to the step-into, the step-return of the machine pedal 7 and controls the driving motor 4, various types of solenoids (not shown) of the machine, etc.

FIG. 3 is a construction sectional view of the driving motor 4. 8 is a mounting base, which is mounted on the machine table 2 and is integrally disposed on a frame 9. 10 is a stator iron core mounted on the inner face of the frame 9, stator winding being wound around the iron core. 12 is a motor shaft, which has a pulley (not shown) mounted on the shaft end projected outwardly of the frame 9 and is rotatably supported with ball bearings disposed on the frame 9 and the bracket 13. 16 is a rotor yoke composed of many steel plates built in a layer and is secured to the shaft 12. 17 is a permanent magnet, which is bonded and secured on the outer peripheral face of the rotor yoke 16 to constitute a rotor and has four circular-arc-shaped permanent magnetic pieces arranged in a ring shape. The permanent magnet 17 is excited in a diametrical direction in FIG. 3 to constitute a rotor of four poles. Also, the permanent magnet 17 is retained in position with support plates 18 and 19 and is surrounded in its outer periphery with reinforcement tape 20 made of an insulator. 21 is a speed detecting permanent magnet, which rotates integrally with the shaft 12 and is excited in many poles. 22 is a speed detecting element composed of a magnetic resistor element disposed in opposition to the speed detecting permanent magnet 21 to constitute a speed detector, together with the permanent magnet 21. 23 is a permanent magnet, for detecting the rotor position, rotating integrally with the shaft 12, the permanent magnet being the same in the number of poles as the permanent magnet 17 constituting a rotor, to constitute a rotor position detector with a position detecting element 25 composed of three hall elements disposed on a sensor base plate 24. 26 is a pulley cover, which is secured to the frame 9. 27 is a fan cover, which covers a cooling fan 28 and is mounted on a bracket 13.

Figure 4:
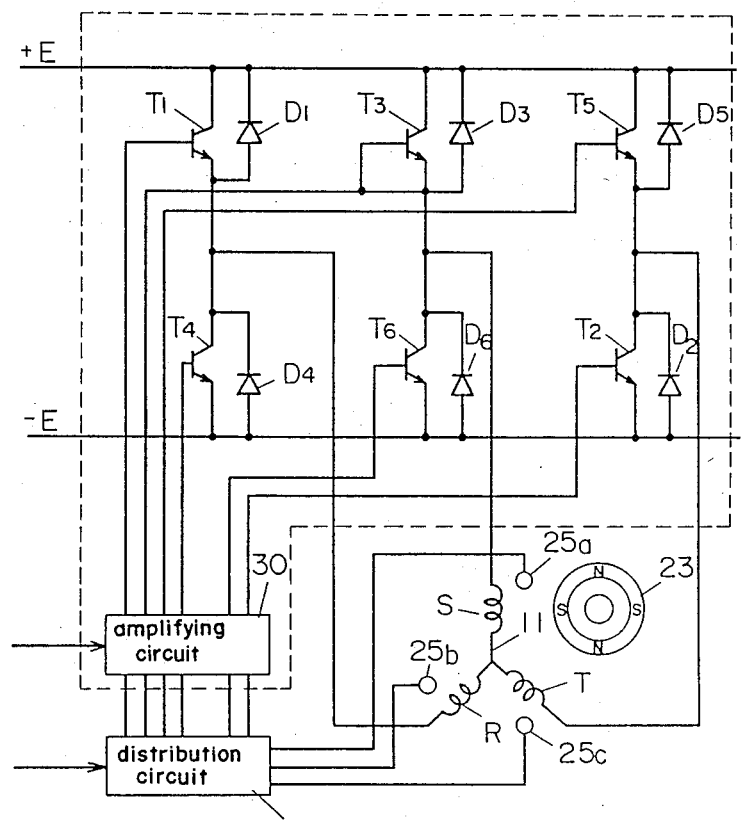
FIG. 4 is a circuit diagram showing the drive portion of the present invention.

FIG. 4 shows a drive circuit for a driving motor 4. The stator winding 11 is composed of windings of three phases, i.e., R phase, S phase and T phase. 25a, 25b and 25c are position detecting elements for detecting the magnetic-pole position of the rotor, namely, the magnetic-pole position of the permanent magnet 23 for detecting the rotor position. Power transistors T1, T2, T3, T4, T5 and T6 are connected in a three-phase bridge shape, the winding of each phase of the stator winding 11 is respectively connected with the output portions, and fly-wheel diodes D1, D2, D3, D4, D5 and D6 are connected in parallel with each power transistor. The detection signals of the position detecting elements 25a, 25b and 25c are inputted into a distribution circuit 29 so that a given power transistor is adapted to be driven through an amplification circuit 30.

Figure 5:
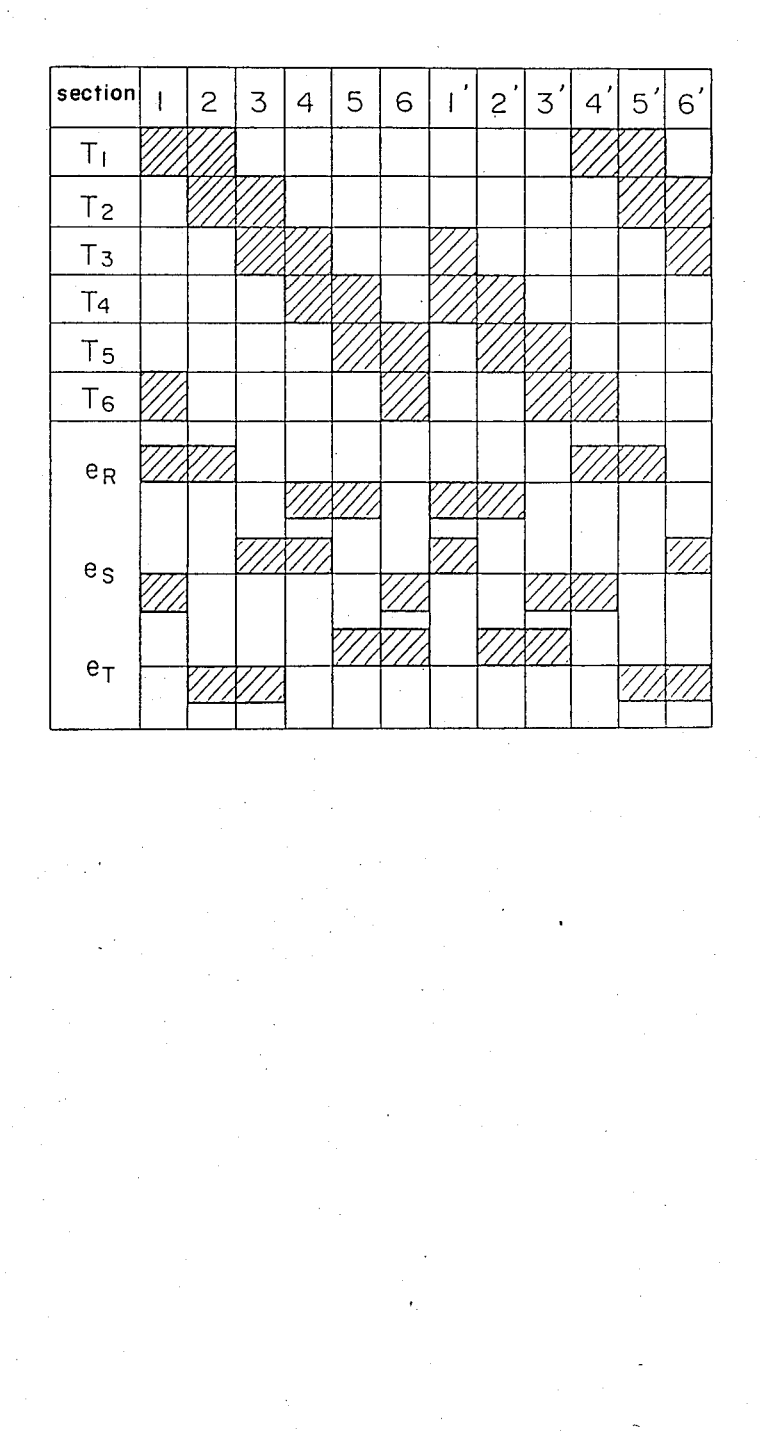

FIG. 5 shows the details of the distribution circuit 29 in a time chart. Sections 1 through 6 show a case where normal rotational torque is caused, sections 1' through 6' show a case where the reverse rotational torque is caused. T1 through T6 correspond to the power transistors in FIG. 4, the oblique line portions show the ON condition of the transistor. $e_R$, $e_S$ and $e_T$ respectively show voltages to be applied upon the R phase, S phase and T phase of the stator winding, the oblique line portions show the application condition of positive or negative voltage. Each section shows the position of the rotor with respect to the stator, section 1 and section 1' are in the same rotor position. Sections 2 and 2', sections 3 and 3', . . . are also the same. When section 1 is compared with section 1', the transistors T1 and T6 are ON in section 1, each application voltage is positive in $e_R$ and negative in $e_S$ to cause the normal rotational torque. On the other hand, in section 1', the transistors T3 and T4 are ON, the voltage is negative in $e_R$ and positive in $e_S$ to cause the reverse rotational torque because of application of the voltage reverse to section 1. This is the same as the reverse rotational damping with the power terminal being reversely connected in the general DC motor.

In FIG. 5, for easy description, each transistor is in a fully energized condition in the respective sections, but actually, the PWM is controlled with the signals of the speed and the position, as described later, to vary the applied average voltage of the stator winding, thereby controlling the rotating torque in the normal or reverse direction.

Figure 6:
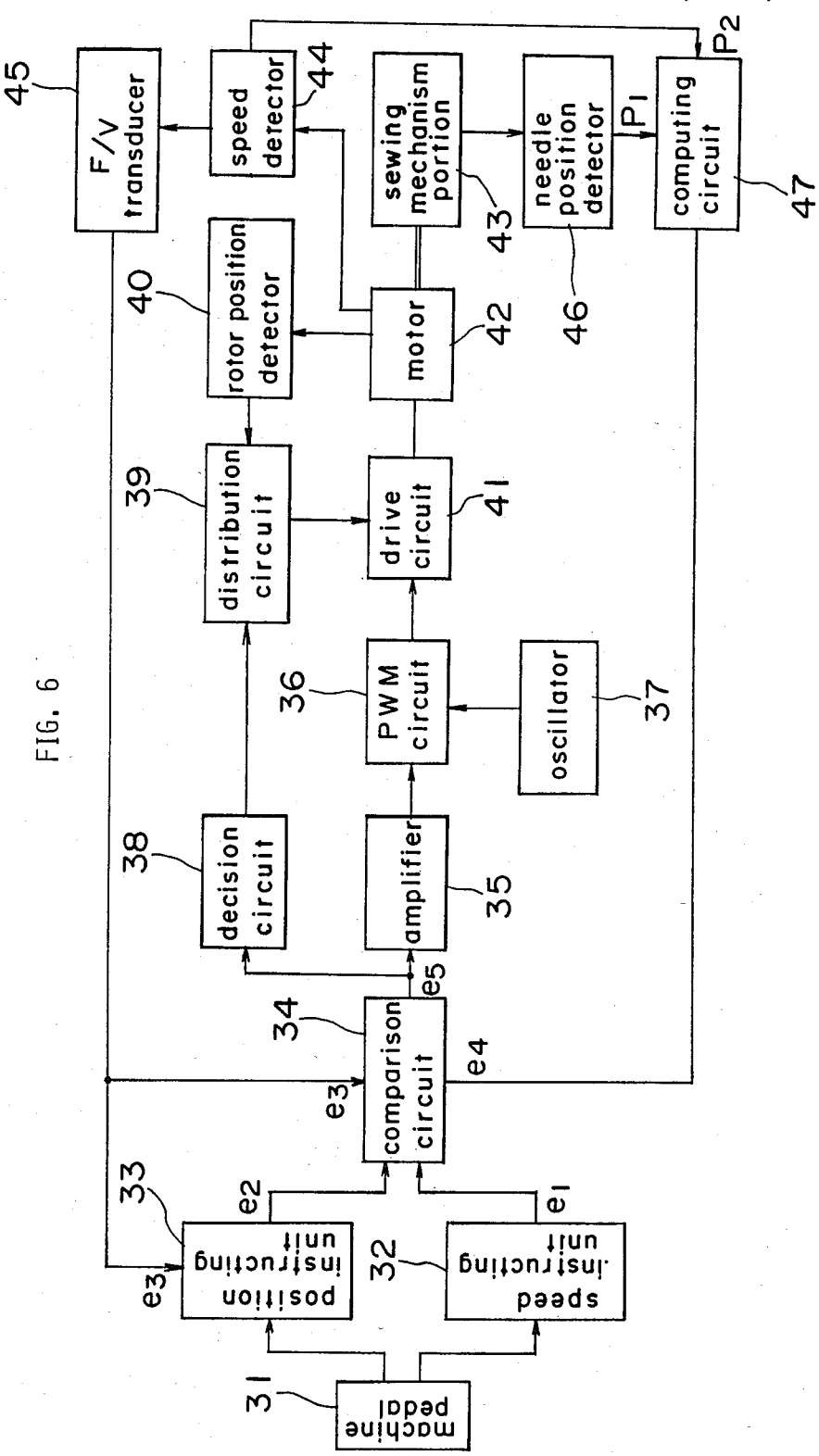
FIG. 6 is a block diagram showing a control circuit of the present invention.

FIG. 6 is a control circuit diagram of a machine driving apparatus of the present invention. 31 is a machine pedal which gives a speed instruction and a given-position stop instruction of the machine needle, and is equivalent to the machine pedal 7 in FIG. 2. 32 is a speed instructing unit, which outputs a signal in accordance with the stepping amount of the pedal at the stepping time of the machine pedal 31, and thereafter generates a given speed instruction signal $e_1$ when the machine pedal 31 has been returned to a neutral position. 33 is a position instructing unit for a needle given-position stop to generate a position instructing signal $e_2$ which becomes a stop instruction signal when the rotating speed has reached a given low speed after the machine pedal 31 was stepped and then was returned to the neutral position. 34 is a comparison circuit which compares the speed instruction signal $e_1$ with the speed detection signal $e_3$ or compares the position instruction signal $e_2$ with the needle position detecting signal $e_4$ to output a difference signal $e_5$. 35 is an amplifier, which amplifies the difference signal $e_5$ to be outputted from a comparison circuit 34. 36 is a PWM circuit (pulse width modulation circuit) which varies the duty of a voltage to be applied upon the stator winding of a motor in accordance with the period and difference signal $e_5$ of a transmitter 37.

38 is a decision circuit, which decides the positive and negative of the difference signal $e_5$ to cause the rotational torque control of the normal or reverse direction to be performed. 39 is a distribution circuit corresponding to 29 in FIG. 4, which receives a signal from a rotor position detector 40 and a signal from a decision circuit 38 to feed to a drive circuit 41 such an output as in FIG.

5. The construction of the drive circuit 41 is shown in FIG. 4. 42 is a machine driving motor composed of a brushless motor, which is constructed in FIG. 3 and drives a sewing mechanism portion 43 of the machine. 44 is a speed detector which generates the pulses of a frequency proportional to the rotational speed of a motor 42 to generate, for example, 360 pulses upon one revolution of the shaft of the motor 42. 45 is an F/V converter (frequency-voltage converter), which converts the detection pulses from the speed detector 44 into the speed detection signals $e_3$ of analog amount. 46 is a light-used needle position detector, which outputs two signals corresponding to a position above the needle and a position under the needle. The signals corresponding to the position above the needle and the position under the needle are respectively one pulse for each one rotation of the machine shaft. 47 is a computing circuit which calculates the pulse signals from the needle position detector 46 and the pulse signal from the speed detector 44 to output analog signals.

Figure 7:
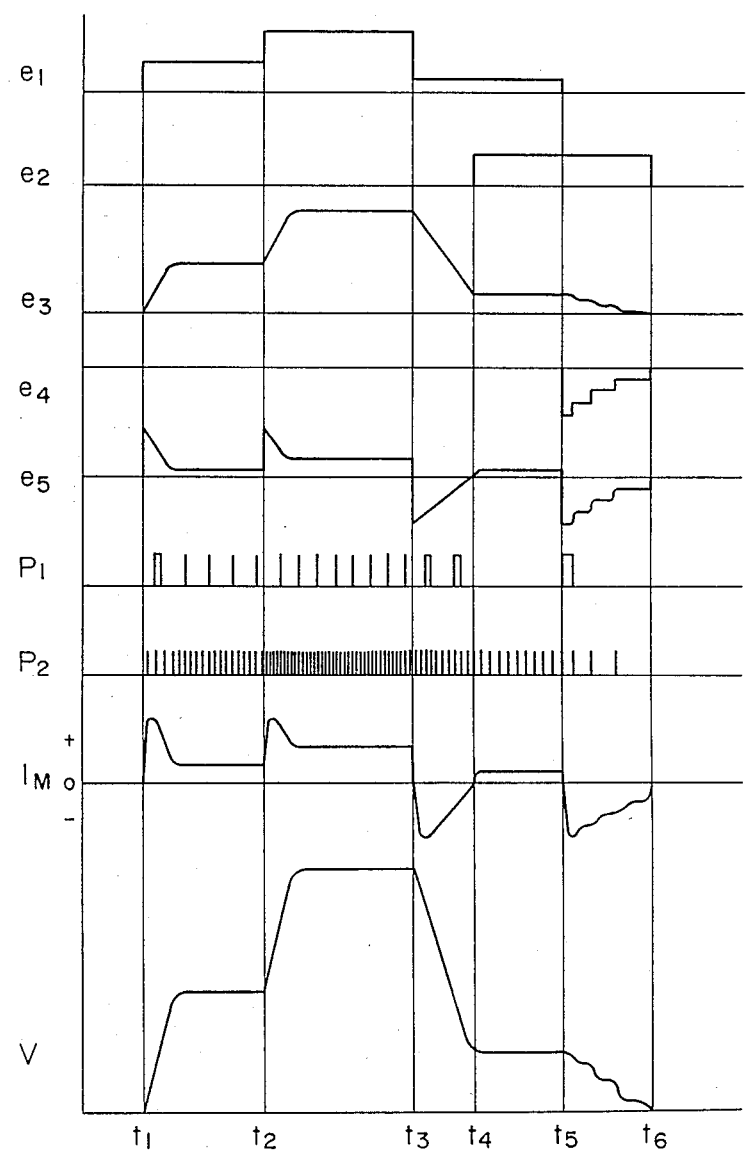
FIG. 7 is a time chart for describing the operation of the circuit of FIG. 6.

Then, the operation of the control circuit will be described by the use of a time chart of FIG. 7. In FIG. 7, $e_1$ through $e_5$ are the respective signals of FIG. 6, $P_1$ is a detection pulse signal of the needle position detector 46, and $P_2$ shows a detection pulse signal of a speed detector 44. $I_M$ is an average value of a motor current; the plus shows a current during the normal operation and the minus shows a current during the reverse operation damping. V shows the rotational speed of the machine shaft.

Now, when in the $t_1$, the machine pedal 31 is stepped as far as a position corresponding to an intermediate speed position, a motor current $I_M$ proportional to the difference signal $e_5$ of the speed instruction signal $e_1$ and the speed detection signal $e_3$ flows. In this case, as the difference signal $e_3$ is positive, the voltage is sequentially applied upon the stator winding of a given phase selected by the distribution circuit 39 so that the normal operational torque may be caused by the decision circuit 38, and the machine is operated at an intermediate speed. When the machine pedal has been stepped further so far as a position corresponding to a high speed position at the $t_2$, the speed instruction signal $e_1$ rises and the machine is operated at a high speed.

As described hereinabove, the machine is operated at a variable speed in accordance with the stepping amount of the pedal 31. Then, when the machine pedal 31 is returned to its intermediate position at the $t_3$, a speed instruction signal $e_1$ of a given low speed is set to output by a storing circuit disposed in the speed instructing unit 32, a motor current $I_M$ is controlled in accordance with a difference signal $e_5$ which is an output of a comparison circuit 34, but in this case, the difference signal $e_5$ becomes a negative signal. Thus, the voltage is applied upon the stator winding of a given phase selected by the distribution circuit 39 so that the damping torque may be caused by the decision circuit 38. The machine speed is rapidly reduced from the $t_3$ as shown in V, and becomes low in the operational speed at the $t_4$. The position instruction signal $e_2$, which is a stop instruction signal, is set by a storing circuit disposed in a position instructing unit 33 in a condition where the pedal 31 is neutral and the machine speed V has reached a given low speed, i.e., at the $t_4$. Then, the speed instruction signal $e_1$ of a low speed is reset with a needle position detecting pulse signal $P_1$ to be detected by a needle position detector 46. Furthermore, a computing circuit 47 is set with a needle position detecting pulse signal $P_1$ to cause a needle position detecting signal $e_4$. The needle position detecting signal $e_4$ is a signal which reduces in stages each time the speed detection pulse signals $P_2$ are counted, the needle position detecting signal $e_4$ becomes zero when a given number of pulses, in the present example, four pulses are counted, and the machine stops at a given position, i.e., at a position of $t_6$ of the fourth pulse of the detection pulse $P_2$ from the position of the $t_5$. It is to be noted that in the above-described embodiment, a case where a damping current is rendered zero when a given number of pulses of the speed detection pulse signal $P_2$ is counted has been described, but the damping may be started with the needle position detecting pulse signal $P_1$, and the damping may be rendered zero by the fact that the speed detecting signal $e_3$ has become zero.

It is to be noted that in the above embodiment, a speed detector 44 is adapted to detect the rotational speed of a motor 42, but may be constructed to detect the rotational speed of the machine shaft. Also, the speed detector 44 uses a system of magnetically detecting the speed, but may use a light system or the like in addition to it. Furthermore, a needle position detector 46 may have the light system replaced by the magnetic system.

Figure 8:
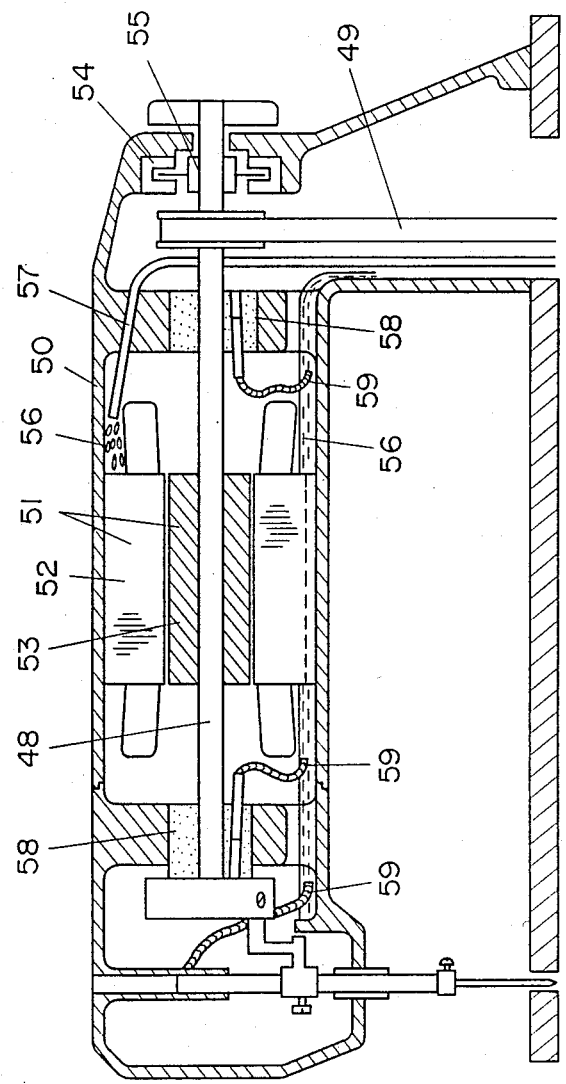
FIG. 8 is a cross-sectional view of a machine head showing a second embodiment of the present invention.

FIG. 8 is a construction sectional view of a machine head in the other embodiment of the present invention. A driving motor as shown in FIG. 3 is built in the machine head.

In FIG. 8, 48 is a top shaft of the machine, which is connected with the bottom shaft (not shown) through a belt 49. 50 is a head frame which has a stator 52 of a driving motor 51 secured to the inner peripheral portion. A rotor 53, composed of a permanent magnet, is secured to the top shaft 48. The driving motor 51 of the present example is a brushless motor, which allows the variable-speed operation and the needle given-position stop to be performed through combination with a control circuit (not shown) shown in FIG. 6. 54 is a detector of the speed, needle position and rotor position, which is composed of an optical encoder, its rotary portion 55 is secured to the top shaft 48. An object of detecting the rotor position is to switch the energization to each phase of the stator winding of the stator 52 by the position of the rotor 53. 56 is lubricating oil and 57 is an oil feeding pipe. The lubricating oil 56, which was drawn up by a pump from an oil pan portion (not shown) disposed in the lower portion of the machine, is generally fed to the bearing 58 composed of sintering alloy, but in the present example, the lubricating oil is fed, at first, to the stator 52, and is fed through an oil feeding cord 59 to the bearing 58 after the stator 52 has been cooled.

INDUSTRIAL APPLICABILITY

As apparent from the above description, the present invention has the following effects.

(1) A driving motor is provided as a brushless motor which is capable of variable speed operation and reverse damping operation. The rotating force and damping of the motor may be transmitted directly to the machine without providing the clutch and the brake. Sliding friction of the portion of the clutch and the brake is removed, thus resulting in improved durability.

(2) Smaller size and lighter weight are realized through the removal of the clutch brake and the flywheel, and the weight ratio is reduced by several tens % through comparison with the clutch type.

(3) As the type is a direct drive one, and the motor is also stopped during the stop of the machine, the power consumption amount is considerably reduced.

(4) As the brushless motor uses a permanent magnet, the time constant may be reduced through comparison with an electromagnetic clutch, and higher stability and responsive properties of the speed may be realized to increase the stop position accuracy of the machine needle.

(5) The driving motor is built-in in the machine head to simplify the engagement and disengagement of the machine and the machine driving apparatus, and the shaft, frame and bearing, primarily necessary for the driving motor, are used jointly with the respective mechanisms of the machine to realize the simplified construction and the considerable reduction in cost.

(6) What is used as the lubricating oil of the machine is also used in cooling the driving motor, so that the fan for cooling the motor becomes unnecessary, thereby removing unpleasant feelings which are caused by the cooling air touching the operator.

I claim:

1. A machine driving apparatus comprising a driving motor composed of a brushless motor for driving a machine shaft, a rotor position detector for detecting the rotor position of said motor, a distribution circuit which switches the energization phase of the stator winding of a motor in accordance with a signal from said rotor position detector, a speed detector for detecting the rotational speed of the machine shaft or the motor, a needle position detector for detecting the position of the needle shaft, a speed instructing unit for generating a speed instruction signal in accordance with the operation of the machine pedal, a position instructing unit for generating a position instructing signal which becomes a stop instructing signal in accordance with the operation of said machine pedal, a comparison circuit which compares a speed instructing signal with a speed detecting signal or a position instructing signal with a position detecting signal to output a difference signal, a drive circuit which closes a current proportional to said difference signal to the stator winding selected by said distribution circuit to drive said motor, a decision circuit which decides the positive and negative of the difference signal to be outputted from said comparison circuit to switch the operational mode of said distribution circuit into a positive operational torque generating mode and a reverse operational torque generating mode, wherein said motor is damped in reverse operation by a position instructing signal in accordance with the operation of said machine pedal and a needle position detecting signal detected by said needle position detector to stop the machine needle in a given position.

2. A machine driving apparatus in accordance with claim 1, wherein a reverse operation damping of the motor is started with a position instructing signal to be generated by a position instructing unit, a given number of pulses of a speed detection pulse signal detected by a speed detector is counted to complete the reverse operation damping.

3. A machine driving apparatus in accordance with claim 1, wherein a reverse operation damping of the motor is started with a position instructing signal to be generated by a position instructing unit, a stop condition is detected by a speed detector to complete the reverse operation damping.

4. A machine driving apparatus in accordance with claim 1, wherein a position instructing unit is adapted to generate a position instructing signal when the rotational speed of the motor has reached a given low speed with the machine pedal being stepped and thereafter being returned to the neutral position.

5. A machine driving apparatus in accordance with claim 3, wherein a position instructing unit is adapted to generate a position instructing signal when the rotational speed of the motor has reached a given low speed with the machine pedal being stepped and thereafter being returned to the neutral position.

6. A machine driving apparatus comprising a sewing machine driving motor including: a brushless motor for driving a shaft of the sewing machine; a rotor position detector for detecting the rotor position of said motor, a switching means for switching the conducting phase of a stator winding of a motor in accordance with a signal from said rotor position detector; a speed detector for detecting the rotational speed of said machine shaft or motor; a needle position detector for detecting the position of a needle shaft of the sewing machine; a speed instructing unit for generating a speed instruction signal in accordance with the operation of a machine pedal of the sewing machine; a position instructing unit for generating a position instructing signal which becomes a stop instructing signal in accordance with the operation of said machine pedal; a comparison circuit for comparing a speed instructing signal with a speed detecting signal or for comparing a position instructing signal with a position detecting signal and for outputting a difference signal therebetween; a drive circuit for feeding a current proportional to said difference signal to the stator winding selected by said switching means for driving said motor; a decision circuit for selecting either the positive or negative of the difference signal which is outputted from said comparison circuit so as to respectively switch the operational mode of said distribution circuit into either a positive operational torque generating mode or a reverse operational torque generating mode, wherein said motor is damped in reverse operation by a position instructing signal in accordance with the operation of said machine pedal and a needle position detecting signal detected by said needle position detector so as to stop said machine needle in a given position; wherein a rotor of said motor is affixed to an upper portion of said machine shaft and a stator of said motor is affixed to an inner peripheral portion of a head frame of the sewing machine.

* * * * *